United States Patent [19]

Johnson

[11] Patent Number: 4,488,535
[45] Date of Patent: Dec. 18, 1984

[54] PORTABLE COOKING GRILL

[76] Inventor: Richard J. Johnson, P.O. Box 1048, Westmont, Ill. 60559

[21] Appl. No.: 488,147

[22] Filed: Apr. 25, 1983

[51] Int. Cl.³ ............................................. A47J 37/00
[52] U.S. Cl. .................................. 126/25 A; 126/9 R
[58] Field of Search ................ 126/9 R, 9 A, 9 B, 30, 126/29, 25 R, 25 A

[56] References Cited

U.S. PATENT DOCUMENTS

| | | | |
|---|---|---|---|
| 1,540,434 | 6/1925 | Stone | 126/25 A |
| 2,122,275 | 6/1938 | Bitney | 126/25 R |
| 2,541,528 | 2/1951 | McAvoy | 126/25 A |
| 2,638,888 | 5/1953 | Molla | 126/25 A |
| 2,787,996 | 4/1957 | Rumsey | 126/25 R |
| 4,109,567 | 8/1978 | Gage | 126/30 |

Primary Examiner—Samuel Scott
Attorney, Agent, or Firm—John H. Shurtleff

[57] ABSTRACT

It is an object of the present invention to provide a portable cooking grill of the kind intended for use outdoor charcoal cooking. In one embodiment, the grill according to the invention may be relatively small and easily carried on camping hikes. In another embodiment, the grill of the invention is completely collapsible but is useful as a large multipurpose apparatus for use in charcoal cooking for a large number of people. The invention provides adjustable features, including at least one grill unit and/or a cooking pan which can be handled while hot but very safely. Moreover, the supporting frame of the grill and the added cooking members such as grill units, pans or the like are structured to permit these added members to be placed in horizontal or inclined positions and at preselected levels above the ground. Yet another object of the invention is to provide adjusting means including handle bars attached to the cooking pan so that it can be easily repositioned or removed from the grill frame in a safe and secure manner.

20 Claims, 14 Drawing Figures

U.S. Patent  Dec. 18, 1984  Sheet 2 of 2  4,488,535
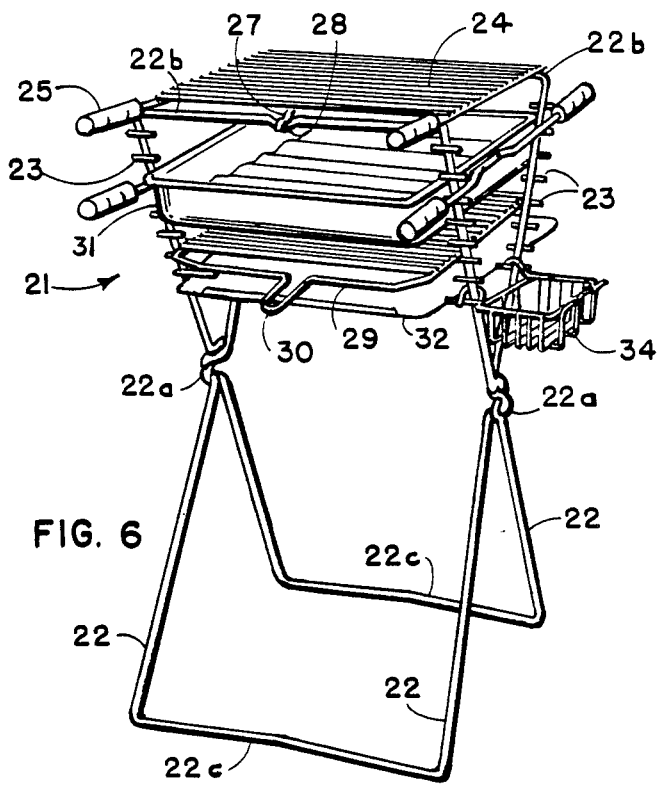
FIG. 6
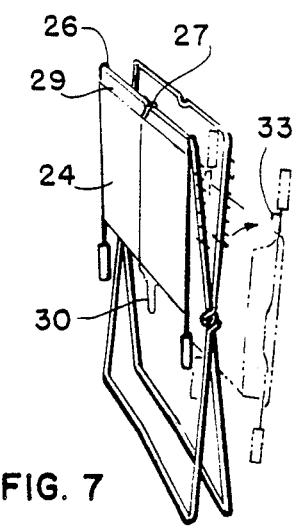
FIG. 7
FIG. 8
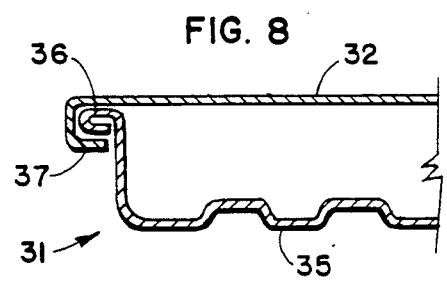
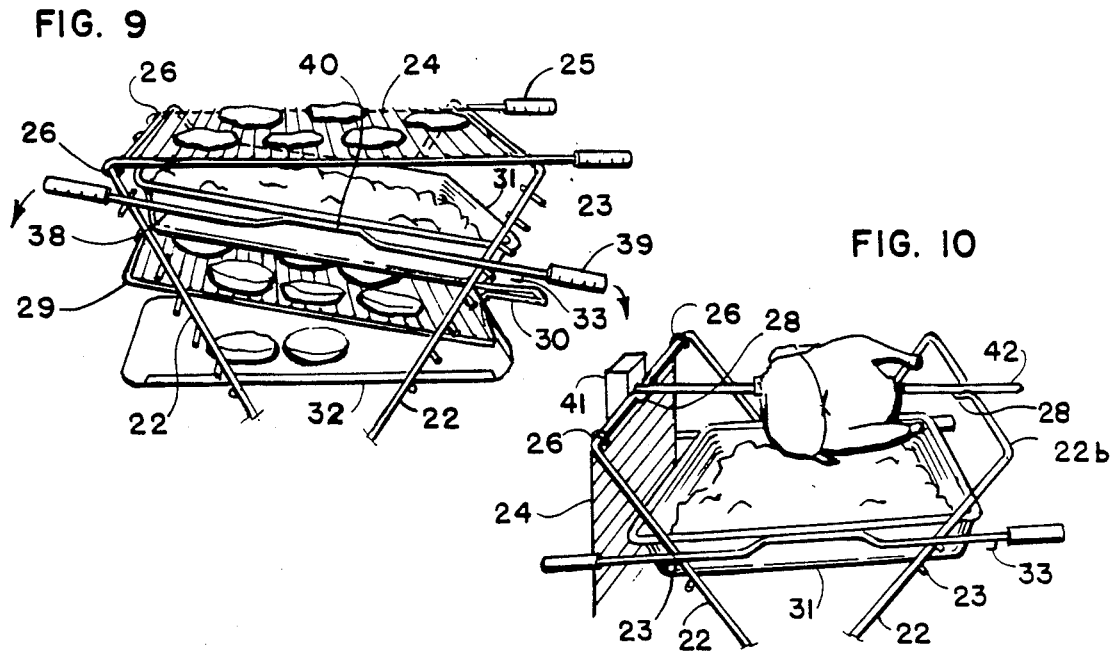
FIG. 9
FIG. 10

PORTABLE COOKING GRILL

BACKGROUND OF THE INVENTION

This invention relates to a portable cooking grill of the knockdown or collapsible type, and more particularly to a cooking device capable of being used under various conditions and with a number of adjustable features in the placement of one or more grills, pans, griddles, charcoal boxes and the like. There is a need in this art for a highly versatile portable cooking grill which is reasonably economical and simple to use.

A number of small and inexpensive charcoal grills have been suggested as indicated by the following patents: U.S. Pat. Nos. 2,164,835; 2,486,708; 3,064,637; and 3,249,101. Although these grills are made of relatively few parts and may offer some degree of adjustment, they provide only a single fixed placement of the open grill member as an essential part of the supporting structure. As a result, the grill cannot be removed during or immediately after cooking food thereon. These simple grills also tend to be relatively unstable and difficult if not impossible to collapse or disassemble as long as hot coals are still present. The handling of hot coals is a serious safety problem which is often ignored in this art.

Larger and more complex portable charcoal grills have been disclosed as illustrated, for example, by the following patents: U.S. Pat. Nos. 2,787,996; 2,994,315; 3,490,433. While these known grills offer adjustable positions for the grill and/or a heating or cooking pan, it is difficult or very unsafe to make these changes while the unit is being used for cooking. And there is only a limited number of adjustments or changes which can be made because the grill remains fixed or the heating pan can only be moved between a few different horizontal positions. The use of solid side panels and elongated guide or support flanges substantially increases the weight and cost of the supporting framework. On the other hand, the use of a collapsible tubular or rod framework tends to increase costs of fabrication while reducing the stability of a taller supported grill. The safe handling of the hot charcoal represents an even more serious problem as the size and/or height of the unit increases.

More permanent and very sturdy grills, broilers, stoves or the like have been constructed with a higher degree of safety, as shown in the following patents: U.S. Pat. Nos. 2,425,036; 2,541,528; and 2,638,888. These kinds of grills, while practical for expensive custom installations or semi-commercial use, are very expensive in both materials and fabrication and exhibit practically no portability or collapsibility for storage and transport purposes. The adjustable features are safer than in smaller units, but the kinds of adjustments and the relative mobility of grill members is very limited.

SUMMARY OF THE INVENTION

It is an object of the present invention to provide a portable cooking grill of the kind intended for use outdoors, e.g. for camping, picnics or frequent charcoal cooking in the yard. In one embodiment, the grill according to the invention may be relatively small and easily carried on camping hikes. In another embodiment, the grill of the invention is completely collapsible but is useful as a large multipurpose apparatus especially adapted for use in charcoal cooking for a large number of people. More particularly, the invention provides a portable cooking grill with adjustable features, including at least one grill unit and/or a cooking pan which can be handled while hot but under very safe conditions. Moreover, the supporting frame of the grill and the added cooking members such as grill units, pans or the like are structured to permit these added members to be placed in horizontal or inclined positions and at preselected levels above the ground. Yet another object of the invention is to provide adjusting means including handle bars attached to the cooking pan so that it can be easily repositioned or removed from the grill frame in a safe and secure manner.

These and other objects and advantages have been achieved in a portable cooking grill according to the invention which comprises: a knockdown supporting frame having four leg members extending upwardly from the ground to provide the four corner positions of a rectangle, as viewed on a horizontal plane passing through the frame, and two parallel crosspieces, each of which connects upper corner positions between any of two opposing leg members, respectively; a plurality of studs mounted at intervals along each of the leg members to project a short distance from their respective corner positions at preselected levels above the ground; and at least one removable cooking member constructed and arranged to be held in a substantially horizontal position by said crosspieces or in a horizontal to inclined position by a set of the studs in pairs located at the same or different preselected levels above the ground.

In the most economical embodiment of the invention, one can employ a simple box frame with four upright legs and a grill unit which may also furnish crosspieces to strengthen the frame. A preferred embodiment is one employing a collapsible X-frame with two pairs of crossed legs which pivot at a middle joint and are preferably self-locking. In the case of a box frame, two opposing leg members can be connected by a crosspiece between upper corner positions at the front and back end, respectively, or else along the two sides, i.e. from front to back. With an X-frame, the two opposing parallel legs on either side of the frame are preferably joined at their top end by an integral crosspiece, i.e. so that each pair of opposing legs is made from a single length of a rod, bar, tube or similar stock material by bending each leg at right angles to the center portion which becomes the crosspiece. Variations in these frame structures will be readily suggested by the illustrated embodiments disclosed hereinafter.

The term "cooking member" is employed in this specification and the accompanying claims to include any part which performs a cooking function, i.e. to hold or position the fuel such as charcoal or the food being warmed, heated, broiled or otherwise cooked. The "cooking pan" is normally used as the fuel box in the form of a relatively shallow pan but may also be used to hold the food being cooked, e.g. as an open pan or as an oven member. The "grill unit" is a typical rectangular cooking grill with transverse and/or longitudinal wires or rods to hold food for broiling. This grill unit may be in the form of a grid or grating and used as a food storing shelf or even a fuel shelf.

THE DRAWINGS

The invention is described below in greater detail with reference to the embodiments illustrated in the accompanying drawings wherein FIG. 1 is a perspective view of a small portable grill with the legs of the frame adapted to be staked into the ground, and including a top grill unit and a cooking pan (shown in phantom);

FIGS. 1b, 1c and 1d illustrate three alternatives for the cross-sections of studs on the frame legs and of the handles mounted on the pan of FIG. 1a;

FIG. 6 is a perspective view of a larger self-supporting, portable cooking grill utilizing a collapsible X-frame construction and adapted to hold a variety of cooking members in a number of different adjustable positions;

FIG. 7 is a perspective view of the grill of FIG. 6 shown after being collapsed and ready for storage;

FIG. 8 is an enlarged but partial cross-sectional view of the cooking pan used in the embodiment of FIG. 6 to illustrate the sliding engagement of the combination lid, griddle and tray used with this pan;

FIG. 9 is a partial side perspective view of the cooking grill of FIG. 6 to illustrate the inclined position of certain members to achieve variations in the cooking temperature; and FIG. 10 is another partial side perspective view of the cooking grill of FIG. 6 to illustrate an arrangement suitable for mounting a conventional motor-driven spit or rotisserie.

DESCRIPTION OF THE PREFERRED EMBODIMENTS

Figure 1:
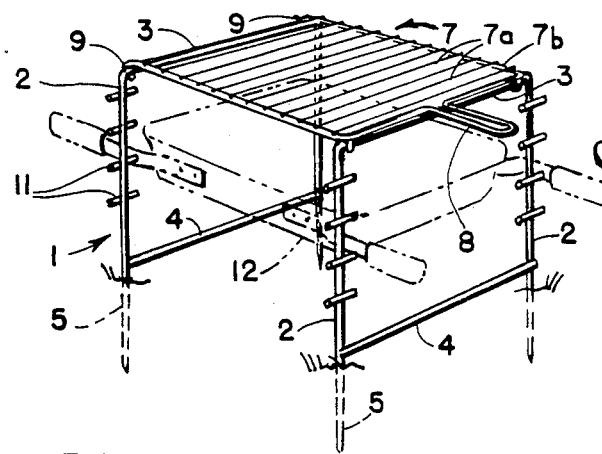
Figure 2:
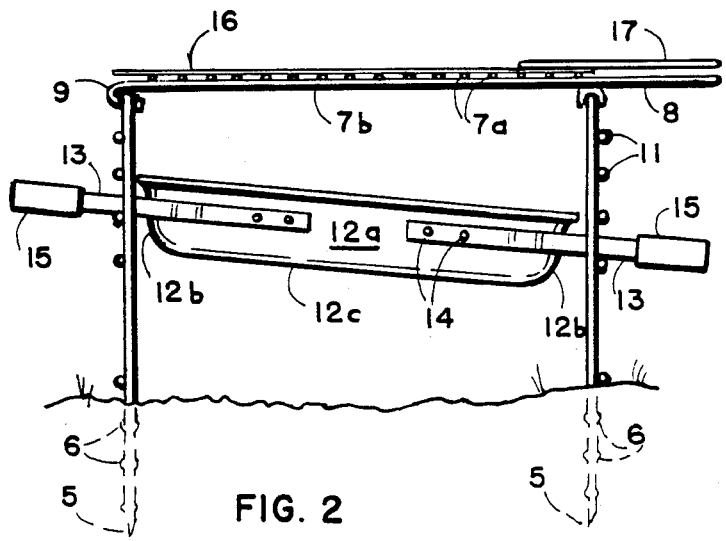
FIG. 2 is a side elevational view of the cooking elements of FIGS. 1 and 1a, including the cover plate used as a griddle resting upon the top grill unit and further illustrating an inclined position of the cooking pan.
Figure 3:
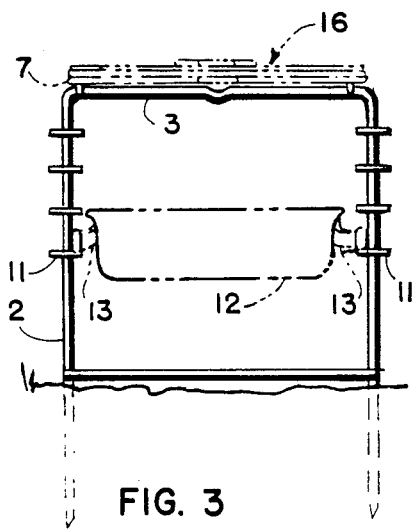
FIG. 3 is an end view of the portable grill of FIGS. 1 and 2 with all of the cooking elements shown in phantom lines.

Referring first to FIGS. 1-3, there is illustrated a portable camping grill utilizing a simple box grill 1 having four upright legs 2 providing the four corner positions, each pair of legs at the front and rear of the frame being joined at the top by a crosspiece 3, preferably integral with each leg 2 so as to be fabricated from a single length of rod or wire. A lower crosspiece 4 is added to strengthen the frame and to provide a stop and leveling means as the downwardly extending staking parts 5 of the legs 2 are forced into the ground. As indicated in FIGS. 2 and 3, these staking parts 5 can be edge-crimped to provide thin protruding ribs 6 or the like which facilitate pushing the legs into the ground and also help to hold the legs in a firmer and steadier manner.

A rectangular grill unit 7 with a wire handle 8 at one end is made with transverse wires or rods 7a spaced at regular intervals along its length, it being possible to use any open rack or grid type of structure commonly employed for broiling or barbecuing. At the end opposite the handle 8, the grill unit contains two hook mounting elements 9 which can be formed out of the longitudinal side rod members 7b of the grill unit. These hooks 9 together with C-locks 10 connect the grill unit 7 to the crosspieces 3 at the back and front of the frame, respectively, but can be easily disengaged by lifting handle 8 and then pushing the grill unit forwardly until the hook 9 is released. The C-locks can be welded onto the underside of the rods 7b so as to lightly clamp the front crosspiece 3. Alternatively, the C-locks can be welded onto the topside of the front crosspiece 3 to engage the side rods 7b and hold them in place. However, in this embodiment, it is desirable to arrange a hook, lock or clamping means on both the front and back ends of the grill unit so that it may also be inserted and locked in place at any horizontal level on a set of four studs 11 arranged at the same level above the ground.

These studs 11 are preferably welded onto the legs 2 at frequent predetermined levels to offer as many levels as possible in arranging cooking members. As shown most clearly in FIG. 3, the studs 11 can extend horizontally a short distance on either side of each leg 2, but should not extend so far inwardly of the frame 1 as to interfere with the placement or positioning of the cooking pan 12 (shown in phantom outline in FIGS. 1 and 3). While the illustrated studs 11 have the cross-section shown in FIG. 1d, it will be apparent that the cross-section 1c or variations thereof would also be equally useful. It is essential only to provide a strong welded connection so that the studs are capable of holding the weight of various cooking members.

Figure 1A:
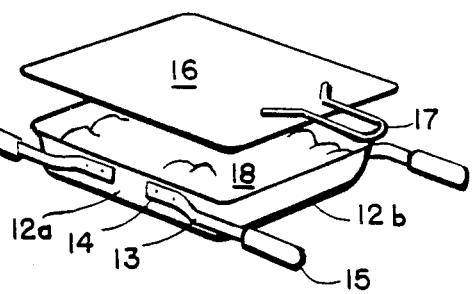
FIG. 1a is a perspective exploded view of the pan and a cover plate to be used with the grill of FIG. 1.

The cooking pan 12 is shown in greater detail in FIGS. 1a and 2, being a relatively shallow pan with two side panels 12a, two end panels 12b and a bottom 12c as one piece, preferably stamped or formed from stainless steel to provide satisfactory resistance against high temperatures. Four laterally flexible or resilient supporting bars 13 are fastened by means of rivets 14 to the side panels 12a of the cooking pan to provide a means to adjustably support the pan in a horizontal or inclined position on a set of four studs 11.

Each of these supporting bars 13 extends longitudinally past the corner positions of the legs 2 so as to engage or rest upon the desired stud 11 when in a normal unflexed or closed position. At their outermost ends beyond the frame 1, the supporting bars 13 are preferably inserted into insulating handle grips 15 which can be grasped firmly by hand, even without wearing protective gloves or using hot pads.

As indicated in FIG. 1a, the supporting bars 13 can be held by handles 15 and flexed laterally inwardly in the direction of the arrows to provide an open position in order to move one end of the pan up or down within the frame 1 between the various levels of paired studs. In a small portable cooking grill, this inward flexing of the supporting bars 13 is easily accomplished, but since the bars are rigid and non-flexing in the supporting direction, i.e. perpendicular to the bottom of the pan, one can firmly and securely hold the pan even when filled with hot coals. For extra safety, two persons should manipulate the hot pan 12 from either end, and they can then cooperate to completely withdraw the pan from the front or the back end, being careful not to touch the hot grill unit 7.

For most light cooking with this small camping grill, there is little need to withdraw the pan 12 completely from the frame 1, but it is very useful to adjust the pan to different levels of heating. The flat lid 16 having handle 17 can fit as a cover over the pan 12 but can also be used as a griddle as shown in FIG. 2, resting on the grill unit 7. This lid 16 may also be used as a tray on the lowermost level of a set of four studs 11, e.g. as a warming, browning or baking tray if the cooking pan 12 with the hot charcoal 18 is moved to the uppermost set of four studs 11. Once cooking is completed, the remaining charcoal can be saved by placing lid 16 directly on top of the pan 12, preferably pressing it down with a rock or other weight to provide a reasonably air-tight fit, thereby snuffing out the hot coals. Once the cooking pan has cooled off, it can be removed from the frame 1 and the dead coals saved for later use. At a permanent campsite, the unit can be left standing in place without any need to remove the closed cooking pan.

Figure 4:
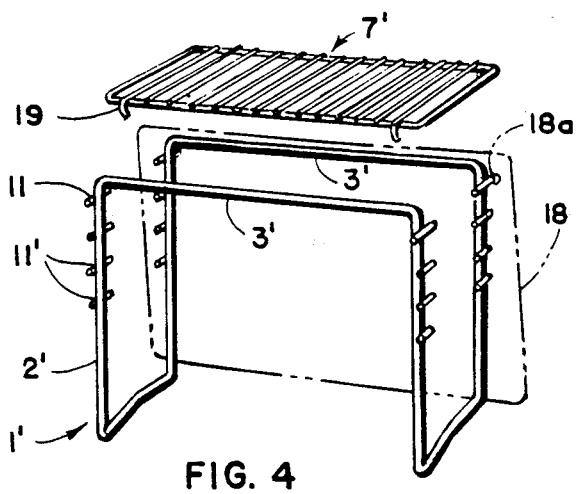
FIGS. 4 and 5 are perspective views of two additional embodiments of suitable box frames for a small knockdown camping grill.
Figure 5:
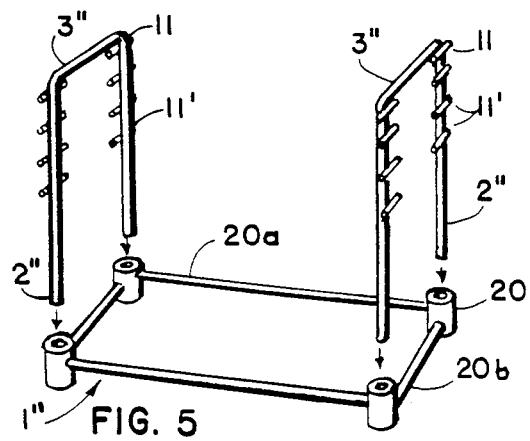

Two additional embodiments of simple box frames 1' and 1" are illustrated in FIGS. 4 and 5, respectively. The advantage of the embodiment shown in FIG. 4 is the fabrication of the entire frame 1' from a single length of wire or rod so as to provide a free-standing box. If made of durable nickel chrome steel, this frame is very easy to maintain and has a very long life. The stud members 11 and 11', used to support a cooking member such as the cooking pan 12, are welded to the upstanding leg portions 2' of the frame. In this case, however, only the uppermost stud 11 extends transversely on either side of the leg 2' while the remaining lower studs 11' extend only inwardly of the leg 2'. This arrangement permits a windshield plate 18 (phantom lines) to be pressed up against the legs 2' on either side of the frame 1', as it is hung on the top studs 11 inserted through openings 18a. Using rocks or soil, the windshield can be firmly wedged against the frame 1' to hold it more firmly in place on the ground. The grill unit 7' in this case is provided with four clamps 19 which can be attached to the two crosspieces 3' by resiliently pressing these crosspieces toward each other as the grill unit 7' is placed thereon and then allowing the crosspieces to spring back against the clamps 19 to lock the grill unit in place. The resulting grill and frame is a very sturdy free-standing unit for use over an ordinary wood fire or with coals in a pan supported on the studs 11 or 11'.

In FIG. 5, the frame 1" consists essentially of the two pairs of end legs 2" joined by the end crosspieces 3" and carrying the welded on studs 11 and 11" as in FIG. 4. In this case, the bottom of the frame is formed by four corner sockets 20 joined by side rods 20a and end rods 21b which can be welded onto the sockets. The bottom ends of the legs 2" are pushed into the socket openings which can include sleeves or a suitable lining material to ensure a tight fit. Again, a relatively sturdy free-standing frame is provided for use with a wood fire or a charcoal filled cooking pan. When this frame is taken apart, it can be easily stored as a very flat and lightweight package.

The larger elevated cooking grill shown as a preferred embodiment in FIGS. 6–10 adopts many of the features described above with reference to smaller camping grills. However, because of its size, it is uniquely adapted to perform many different cooking functions, some of which can be carried out at the same time. At the same time, this collapsible cooking grill can be quickly and easily assembled for use and can be readily collapsed and stored in a packing carton. It is therefore ideal for larger families traveling in a camper or other recreational vehicle, and it may also be used when cooking for large groups at picnics or other outdoor parties.

In FIG. 6, the cooking grill is shown when it is completely assembled with most of the cooking members in place. The base supporting frame 21 is a collapsible X-frame in which the four upwardly extending leg members 22 cross each other in pairs on either side of the frame while pivoting on a so-called knuckle joint 22a which is self-locking when the frame is opened to the standing position. This construction permits the use of just two rectangular continuous wire frames, preferably using a nickel chrome steel rod, so that the top and bottom crosspieces 22b and 22c, respectively, connect the opposing parallel legs 22.

The upper portions of the leg members 22 above the knuckle joint 22a are outfitted with a number of the supporting studs 23 which are firmly welded crosswise to the legs so as to extend a short distance to either side of the corner positions formed by the legs. It will be noted that any horizontal plane passing through the legs 22 of the X-frame 21 will define the four corner positions of a rectangle, so that studs 23 mounted along these corner positions can easily act to support the various cooking members.

In FIGS. 6 and 9, an upper grill unit 24 with insulating wood handles 25 is arranged on the top crosspieces 22b of frame 21, in a manner substantially identical to the grill unit shown in FIGS. 1 and 2, using hook elements 26 to engage back crosspiece 22b while resting on the other front crosspiece 22b where the stepdown lug or wire end 27 fits into the front notch 28 of the crosspiece. This lug 27 is also used to retain a second grill unit when stacking these grill units for storage. Thus, a second rectangular grill unit 29 with wire handle 30 is easily mounted on a set of four studs 23 in a horizontal position (FIG. 1) or in an inclined position (FIG. 9) to act as a browning shelf when placed immediately below the cooking pan 31. The lid or cover member 32 for the pan 30 can be placed as a bottom warming shelf as shown in FIG. 9 or it may also be used as a griddle when placed on top of the upper grill unit 24 (not shown). The lid 32 may also act as the top of an oven formed between the upper and lower grill units 24 and 29 when arranged a short distance apart above the cooking pan 31, i.e. so as to reflect heat into the space between the two grill units. Finally, this lid 32 can be made to slide in place over the edges of the pan as shown in greater detail in FIG. 8, thereby providing a relatively air-tight enclosure to put out the hot coals.

When the X-frame is collapsed as shown in FIG. 7, the lower grill unit 29 is hung with its handle 30 at the bottom and its other end placed on the bent lug 27 of grill unit 24 so that both units lie flat against each other. The two grill units are then hung together by means of hooks 26 onto the upper crosspiece 22b of one of the rectangular frame members. The cooking pan 31 is hung in a similar manner by means of hooks 33 over the crosspiece 22b of the other rectangular frame member, preferably with the lid or cover member 32 held in place thereon. Even though the pan 31 has a certain shallow depth, the collapsed unit is very compact and can be readily secured with just a few twist-ties or wire twists around the adjacent leg members 22 of the frame. Even the condiment tray 34 can be removed from its normal position of use on the lowermost pair of studs 23 and hung from the bottom end of one of the grill units for collapsed storage. All of these collapsed members can then be places in the original shipping carton (not shown) which may include a carrying handle.

The cooking pan 31 according to the invention is preferably constructed with a fluted or corrugated bottom 35 as shown in more detail in the partial cross-sectional view of FIG. 8. When using a relatively shallow stainless steel pan of a height of not more than about two inches or not more than about two layers of typical charcoal briquets, it was found that the pan draws air well, especially if fluted with grooves and valleys, each having a width of about one inch, e.g. from ½ to 1¼ inches, and a height of about ¼ inch, e.g. from ⅛ to ⅜ inch and preferably from about ¼ to ½ inch. No holes are needed in the bottom of the pan, and the present invention avoids this common expedient in favor of a pan which can be completely closed with the lid 32.

In FIG. 8, the open edges 36 of the pan have a rolled hem which gives added strength, and the lid 32 has a turned under edge 37 on opposite sides so that it slidably fits onto the pan from either end.

Figures 1B, 1C, 1D:

The variety of cooking functions performed by the larger grill of the invention is well illustrated in FIG. 9 where the top grill unit is used to broil meat with the pan 31 being inclined to provide the meat to be cooked well done, medium and rare, as viewed from left to right in the drawing. It will be noted that the longitudinally extended adjusting bars 38 with insulating handles 39 are welded or preferably riveted at a short inner center section 40 onto the pan 31 and then extend outwardly of the leg members 22 to rest on the outwardly projecting studs 23. In order to adjust the position of the pan 31 at either end, it is necessary to flex the adjusting bars 38 laterally outwardly to a position free of the studs 23 and then move the pan upwardly or downwardly to another stud position. In this case, the bars 38 have a circular cross section as shown in FIG. 1d but may also have the other cross sections as in FIGS. 1b and 1c. These supporting and adjusting bars should be sufficiently stiff to firmly support the pan in a vertical direction when being held by hand at one or both ends, but sufficiently flexible or resilient in a lateral direction to permit movement off and around the studs on both sides of the frame at the same time. Some of this flexing movement can be provided by the pan 31 in yielding to the pressure placed on it by the bars 38 as they are spread apart.

Other arrangements of the arms 38 on pan 31 will be readily apparent in order to achieve a resilient lateral movement from the closed to the open position. It is desirable to achieve this resilience or springing back of the arms into their closed position in order to avoid accidental release of the pan and spilling of the hot coals. The use of steel rods with a relatively long leverage arm up to their attachment to the pan, e.g about one-third the pan length and about one-quarter therebeyond, provides a good combination of both adjustability and secure mounting of the cooking pan.

The lower grill unit 29 in FIG. 9 slides onto the stubs 23 in an inclined position parallel to the bottom of the pan 31 so that food can be browned or cooked on this grill surface from the heat radiating down from the cooking pan. Charcoal reaches very high temperatures so that one can use this lower grill unit or the cover member 32 or both as additional cooking surfaces at the same time that the top grill unit 24 is in use. Such "stacked cooking" is very useful when it is necessary to serve a large number of people.

The portable apparatus of the invention is also capable of being set up as a rotisserie as shown in FIG. 10 where the cooking pan 31 is placed in a horizontal position on one of the lowermost set of studs 23 and the upper grill unit 24 is hung by its end hooks 26 on one of the upper crosspieces 22b of the X-frame 21, this grill unit 24 being used to mount the electric motor 41 which in turn rotates the spit 42. The two ends of the spit 42 turn in place in the notches 28 provided in the center of the two crosspieces 22b. Again, the position of the pan can be slightly inclined to vary the cooking temperature over the length of the spit or the meat being cooked thereon.

All of the cooking members in this large portable grill as well as in the smaller version can be easily and safely removed from the frame at almost any time before, during or after cooking with hot coals. Even with the rotisserie, which is difficult to handle under most circumstances, two persons can lift the grill unit on one side and the spit on the other side to place the cooked meat onto a serving tray or dish. And the cooking pan can be closed with the lid to put out the coals within only a few minutes, thereafter lifting or withdrawing the pan from the frame. Using either a knockdown or completely collapsible frame, the entire apparatus is then easily stored.

The invention is hereby claimed as follows:

1. A portable cooking device comprising:
    a knockdown supporting frame having four leg members extending upwardly from the ground to provide the four corner positions of a rectangel, as viewed on a horizontal plane passing through the frame, and
    two parallel crosspieces, each of which connects upper corner positions between any of two opposing leg members, respectively;
    a plurality of studs mounted at intervals along each of said leg members to project a short distance from said corner positions at preselected levels above the ground;
    at least one removable cooking pan constructed and arranged to be held in a substantially horizontal position by said crosspieces or in a horizontal to inclined position by a set of said studs in pairs located at the same or different preselected levels above the ground; and
    adjusting means including a plurality of bars attached to said pan for flexible movement substantially laterally thereof, said bars extending longitudinally beyond each of the four corner position, respectively, for support on said projecting studs when in a closed position and being movable upwardly or downwardly free of said studs when flexed laterally to an open position.

2. A portable cooking device as claimed in claim 1, including a grill unit with means for attaching it to at least one of said parallel crosspieces.

3. A portable cooking device as claimed in claim 2 wherein said grill unit is removably attached to at least one of said parallel crosspieces by clamping means.

4. A portable cooking device as claimed in claim 3 wherein said grill unit is attached to one of said parallel crosspieces by a releasable hook means.

5. A portable cooking device as claimed in claim 1, wherein said cooking pan fits within the studs at the four corner positions of said frame.

6. A portable cooking device as claimed in claim 1, including a flat griddle sheet sufficiently large to cover and completely enclose the interior of the cooking pan.

7. A portable cooking device as claimed in claim 1 wherein each bar is equipped on its longitudinal extension with an insulating handle grip.

8. A portable cooking device as claimed in claim 1 wherein said four legs are incorporated into a freestanding box frame.

9. A portable cooking device as claimed in claim 8 wherein the entire frame is formed of a single length of wire or rod.

10. A portable cooking device as claimed in claim 8, including a grill unit with means for attaching it to said two parallel crosspieces.

11. A portable cooking device as claimed in claim 1 comprising two pairs of separate leg members, each pair being joined at the top by a crosspiece and each leg having a downwardly extending staking portion adapted to be forced into the ground, and a grill unit with means for attaching it to the two parallel crosspieces.

12. A portable cooking device comprising:
a knockdown supporting frame having four leg members extending upwardly from the ground to provide the four corner positions of a rectangle as viewed on a horizontal plane passing through the frame, and
two parallel crosspieces, each connecting upper corner positions of said leg members at the front and back of the frame, respectively;
a plurality of studs mounted at spaced intervals along each of said leg members to project a short distance from said corner positions at preselected levels above the ground;
a removable grill unit fitting onto and being supported by said crosspieces in an approximately horizontal position between the upper front and back of the frame;
a cooking pan adapted to be positioned predominately within the four corners of said frame; and
adjusting means including four bars attached to said pan for flexible movement substantially laterally thereof, said bars extending longitudinally beyond each of the four corner positions, respectively, for support on said projecting studs when in a closed position and being movable upwardly or downwardly free of said studs when flexed laterally to an open position.

13. A portable cooking device as claimed in claim 12 wherein each bar is equipped in its longitudinal extension with an insulting handle grip.

14. A portable cooking unit as claimed in claim 12, wherein the four leg members extend upwardly at an angle from the ground to cross each other in pairs to provide a collapsible X-frame with pivot means at the point of crossing to lock the frame in a standing position.

15. A portable cooking unit as claimed in claim 12, wherein said grill unit is removably attached to at least one of said parallel crosspieces by clamping means.

16. A portable cooking unit as claimed in claim 15, wherein said grill unit is attached to one of said parallel crosspieces by a releasable hook member.

17. A portable cooking unit as claimed in claim 12, including a flat cover member fitting over and sufficiently large to cover and completely enclose the interior of the cooking pan.

18. A portable cooking unit as claimed in claim 17, wherein said cover member fits slidably onto the pan from either end for storage and is dimensioned so as to be received as a separate cooking unit for support on said projecting studs within said frame.

19. A portable cooking unit as claimed in claim 12, including at least one additional flat cooking unit, said frame providing a sufficient number of studs and spaced intervals along each leg member to support such cooking units both above and below said cooking pan.

20. A portable cooking unit as claimed in claim 12, wherein said adjusting bars are attached to the cooking pan along a short inner center section thereof and then extend outwardly of said leg members to rest on outwardly projecting studs.

* * * * *